Sept. 2, 1930.  S. WIDMER  1,774,534
PROTECTION AND CONTROL OF RECTIFIERS
Filed March 17, 1928
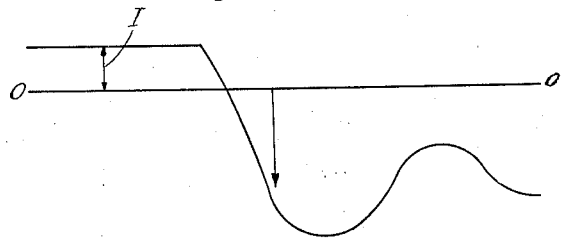
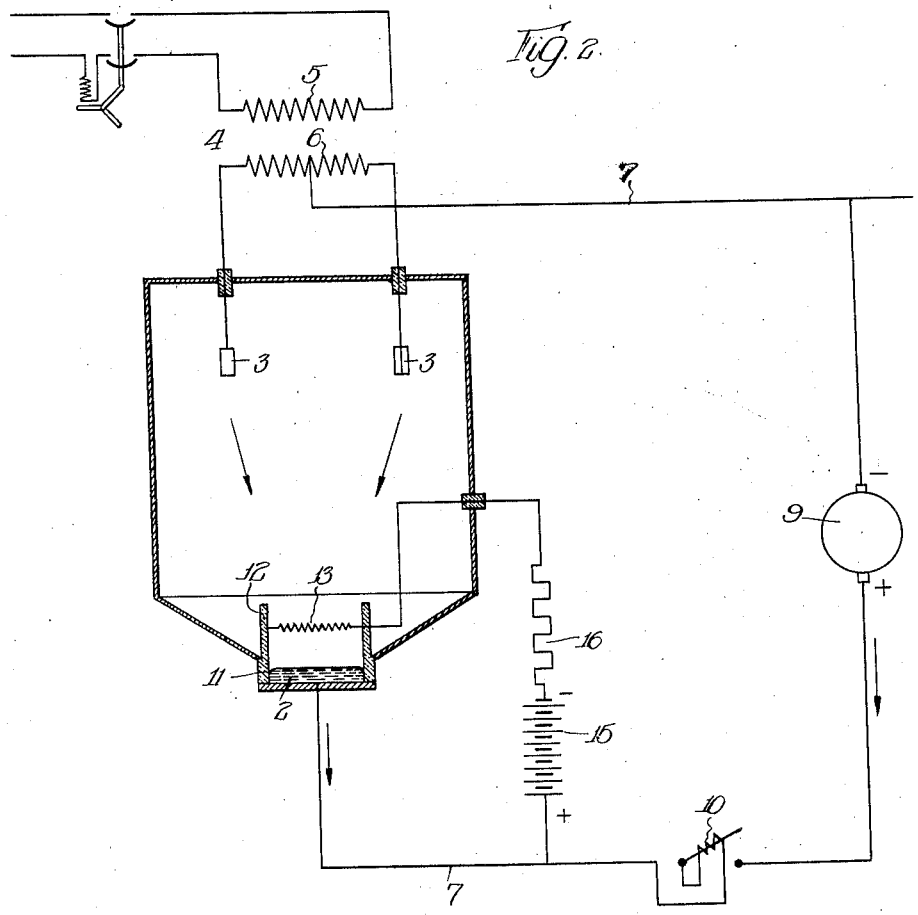
Witness
P. Burkhardt
Inventor:
Stefan Widmer;
By Cromwell, Greist & Warden
Attys Patented Sept. 2, 1930

1,774,534

UNITED STATES PATENT OFFICE

STEFAN WIDMER, OF BADEN, SWITZERLAND, ASSIGNOR TO AKTIENGESELLSCHAFT BROWN, BOVERI & CIE., OF BADEN, SWITZERLAND, A JOINT-STOCK COMPANY OF SWITZERLAND

PROTECTION AND CONTROL OF RECTIFIERS

Application filed March 17, 1928, Serial No. 262,513, and in Germany, March 30, 1927.

This invention relates to the portection and control of rectifiers, particularly of the mercury vapor type, and it has among its objects improved methods and means for controlling the back-fire conditions and protecting the rectifiers against damage by back-fire by providing between the cathode and anode or anodes a grid structure so arranged and connected that a back-fire or reverse arc is suppressed in its inception by reason of the charge or change of potential applied to the grid under such conditions.

The foregoing and other objects of the invention will be best understood from the following description of exemplifications thereof, reference being had to the accompanying drawings, wherein Fig. 1 is a curve diagram illustrating the current flow conditions in a rectifier; and Fig. 2 is a diagrammatic view of a rectifier system illustrating one form of application of the invention.

In the event of a reverse arc or back-fire occuring in gaseous type rectifiers, and particularly in mercury vapor rectifiers that operate in parallel with other direct generating means, such as generators, shunt motors, batteries, a reverse current will flow from the positive terminal of the machine to the cathode of the rectifier, thence to the anode, through the secondary phase of the transformer, to the negative pole of the machine. Immediately prior to the occurrence of a back-fire the current from the rectifier anode flows in the direction to the cathode, and if the conditions of the rectifier are such as to cause back-fire, the current flowing from the back-firing anode will first drop to zero and then undergo reversal. This is illustrated in Fig. 1 wherein the current flowing from an anode is plotted against time. The upper portion of the curve illustrates the rectified or normal current flow I during a rectifying cycle of the anode. This cycle is followed by reversal of the current through the anode and the intermediate stage illustrating the variations which the current from the anode undergoes when a back-fire occurs in the rectifier that is operating in parallel with other direct-current generating machinery or apparatus.

According to the invention I make use of this reversal of the current to negatively charge a grid associated with the cathode so as to suppress the arc reversal at its inception. If the cathode is provided with a grid which is charged so that its potential is either equal or negative with respect to the potential of the anode which back-fires, the flow of current from the cathode to this anode is stopped since the negatively charged grid repels the electrons from the cathode and prevents the formation of the arc. A simple embodiment of the invention in which the desired action is secured without special switching apparatus is shown in Fig. 2 wherein a mercury vapor rectifier is shown provided with a mercury cathode 2 and a pair of anodes 3.

The rectifier is supplied with alternating current from a transformer 4 having a primary winding 5 connected to an alternating-current source, and secondary winding 6 connected to the two anodes 3. Direct-current mains 7 are connected to the cathode 2 and to the midpoint of the secondary transformer winding 6. Operating in parallel with the rectifier are other direct-current generating apparatus, such as a converter 9. A high-speed circuit breaker 10 may be interposed between the rectifier and the converter to disconnect the same from each other.

The rectifier illustrated in the drawing is of the mercury vapor type and includes a cylindrical vessel of insulating material 11 for holding the body of mercury that constitutes the cathode 2. The cylindrical vessel has an upward extension 12 opening toward the anodes 3. Mounted transversely across said extension is a screen or grid structure 13 which I utilize for suppressing the back-fire or reverse arc at its inception, as explained above.

To this end, I connect the cathode grid 13 to the negative terminal of a source of biasing potential, such as a battery 15, having its positive terminal connected to the direct-current mains leading from the cathode 2 of the rectifier. A resistor 16 is connected in the lead between the negative terminal of the battery 15 and the grid 13. During normal operation the high drop in this resistor serves to maintain the grid potential at a value but little different from that of the cathode and thus does not appreciably affect the normal current flow through the rectifier. The voltage of the battery 15 is so chosen that the potential of the grid will be either equal or negative with respect to that of the anode which, during the duration of the backfire, functions as a cathode. Under conditions of normal operation a current will flow to the grid 13 but this current will be so small on account of the resistor 16 that the operation of the rectifier will be in no way adversely affected thereby, the grid potential being substantially the same as that of the cathode 2. However, if the current to the cathode drops to zero, the grid 13 will assume the full potential of the battery 15, thereby repelling the electrons streaming from the cathode and preventing the formation of the back-fire arc at its inception. The high-speed switch 10 is used as an additional protection. On account of the quick suppression and prevention of the back-fire by the action of the grid the duty on the high-speed switch is greatly reduced and in many cases it may be entirely dispensed with.

The invention is not limited to the particular details of construction and methods or arrangements described hereinbefore, but is susceptible of many other modifications. For instance, in place of a source of grid potential, such as a battery 15, some other means equivalent thereto may be used. The invention may be used with equal success on rectifiers of other types than the metal tank rectifier indicated in the drawing. The grid structure may be in the form of a perforated screen encircling the insulated extension 12 or mounted in the interior thereof, or if desired, a metal collar or sleeve may be arranged around the screen, or some other equivalent structure used.

I accordingly desire that the appended claims be given a broad construction commensurate with the scope of the invention.

I claim:

1. The method of protecting mercury vapor rectifiers operating in parallel with independent sources of direct current against reverse current flow under utilization of a grid structure interposed between the cathode and the anode, which comprises maintaining the potential of said grid structure substantially equal to the potential of said cathode under normal current flow conditions and utilizing the reversal of current in the rectifier at the inception of a back-fire to charge said grid to a potential tending to suppress the reverse current flow.

2. The combination with a vapor type rectifier including a cathode and an anode, and a source of counter-electromotive force connected in parallel thereto, of grid means interposed between said cathode and anode, and connections from said grid to the circuit of said rectifier so arranged that the incipient current flowing in said rectifier on occurrence of a reverse current flow charges said grid means to a potential at which the reverse arc is suppressed.

3. The combination of a rectifier of the vapor type including a cathode and an anode, an independent source of counter-electromotive force connected in parallel thereto, grid means interposed between said cathode and said anode, and means arranged to cause the incipient current flowing from an anode tending to back-fire to charge said grid to a potential that is substantially equal or negative with respect to the potential of said anode whereby the reverse arc is suppressed in its initial stages.

4. The combination of a rectifier of the vapor type including a cathode and an anode, an independent source of counter-electromotive force connected in parallel thereto, grid means interposed between said cathode and said anode, and means including a source of potential and a resistor connected between said grid and said rectifier circuit so arranged that under normal current flow conditions the potential of said grid is substantially equal to the potential of said cathode and under conditions preceding a back-fire from an anode the potential of said grid is substantially equal or negative with respect to said anode.

5. The combination of a rectifier of the vapor type including a cathode and an anode, an independent source of counter-electromotive force connected in parallel thereto, grid means interposed between said cathode and said anode, and means including a source of direct-current potential having its positive terminal connected to said cathode and an impedance connected between the negative terminal of said source of potential and said grid so arranged that on occurrence of conditions preceding a reverse current flow from an anode said grid will assume a charge tending to suppress said reverse current flow at its inception.

6. The combination of a rectifier of the vapor type including a cathode and an anode, an independent source of counter-electromotive force connected in parallel thereto, grid means interposed between said cathode and said anode, and means including a source of direct-current potential having its positive terminal connected to said cathode and an impedance connected between the negative terminal of said source of potential and said grid so arranged that under normal current flow conditions the potential of said grid is substantially equal to the potential of said cathode and under conditions preceding a back-fire from an anode the potential of said grid is substantially equal or negative with respect to that of said anode.

In testimony whereof I have hereunto subscribed my name this 28th day of February A. D. 1928, at Zurich, Switzerland.

STEFAN WIDMER.